US010165331B2

(12) United States Patent
Lo et al.

(10) Patent No.: US 10,165,331 B2
(45) Date of Patent: Dec. 25, 2018

(54) METHOD AND DEVICE OPERABLE TO STORE VIDEO AND AUDIO DATA

(71) Applicant: INDUSTRIAL TECHNOLOGY RESEARCH INSTITUTE, Hsinchu (TW)

(72) Inventors: Chi-Wen Lo, Kaohsiung (TW); Yi-Yu Su, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 762 days.

(21) Appl. No.: 14/267,231

(22) Filed: May 1, 2014

(65) Prior Publication Data
US 2015/0128197 A1 May 7, 2015

(30) Foreign Application Priority Data

Nov. 5, 2013 (TW) .............................. 102140172 A

(51) Int. Cl.
*H04N 21/4788* (2011.01)
*H04N 21/472* (2011.01)
(Continued)

(52) U.S. Cl.
CPC ... *H04N 21/4788* (2013.01); *H04N 21/23116* (2013.01); *H04N 21/437* (2013.01);
(Continued)

(58) Field of Classification Search
CPC ....... H04N 21/23106; H04N 21/23113; H04N 21/4788; H04N 21/47202; H04N 21/4622;
(Continued)

(56) References Cited

U.S. PATENT DOCUMENTS

| 79,543 A | 7/1868 | Bigelow |
| 297,432 A | 4/1884 | Neracher |

(Continued)

FOREIGN PATENT DOCUMENTS

| CN | 1983907 A | 6/2007 |
| CN | 101563886 A | 10/2009 |

(Continued)

OTHER PUBLICATIONS

Wu et al., Exploring the Optimal Replication Strategy in P2P-VoD Systems: Characterization and Evaluation, IEEE Transactions on Parallel and Distributed Systems, vol. 23, No. 8, Aug. 2012, pp. 1492-1503.

(Continued)

*Primary Examiner* — An Son P Huynh
(74) *Attorney, Agent, or Firm* — Rabin & Berdo, P.C.

(57) ABSTRACT

According to one exemplary embodiment, a method operable to store video data and/or audio data is adapted to a first peer of a video and audio data system having a plurality of peers, and each peer has a corresponding storage space. In the method, before the first peer has not received a service request of a second peer of the plurality of peers, determines whether the video and audio data received by the first peer is stored in its corresponding storage space with a dynamically adjustable first video and audio storing probability, and extends a time interval of the first peer for storing received video and audio data; and when the first peer receives the service request of the second peer, sets a second video and audio storing probability. Thereby the second peer obtains at least one stored video and audio data from the first peer.

13 Claims, 13 Drawing Sheets

(51) Int. Cl.
H04N 21/462 (2011.01)
H04N 21/63 (2011.01)
H04N 21/437 (2011.01)
H04N 21/231 (2011.01)
H04N 21/433 (2011.01)

(52) U.S. Cl.
CPC ... *H04N 21/4622* (2013.01); *H04N 21/47202* (2013.01); *H04N 21/632* (2013.01); *H04N 21/433* (2013.01)

(58) Field of Classification Search
CPC .. H04N 21/433; H04N 21/437; H04N 21/632; H04L 29/08306
See application file for complete search history.

(56) References Cited

U.S. PATENT DOCUMENTS

| | | | | |
|---|---|---|---|---|
| 7,080,400 | B1* | 7/2006 | Navar | H04N 7/17336 348/E7.073 |
| 7,194,195 | B1 | 3/2007 | Cole et al. | |
| 7,278,153 | B1* | 10/2007 | Sanders | H04N 7/17336 348/E7.073 |
| 8,001,561 | B2* | 8/2011 | Gibbs | G06F 17/30038 725/10 |
| 8,312,068 | B2 | 11/2012 | Matsuo | |
| 8,463,936 | B2 | 6/2013 | Maze et al. | |
| 8,555,323 | B2 | 10/2013 | Zhou et al. | |
| 8,782,701 | B2* | 7/2014 | Yu | H04N 5/44543 725/39 |
| 8,856,846 | B2* | 10/2014 | Applegate | H04N 21/2225 725/86 |
| 2003/0093810 | A1 | 5/2003 | Taniguchi | |
| 2003/0204856 | A1* | 10/2003 | Buxton | H04N 7/17318 725/120 |
| 2005/0028208 | A1* | 2/2005 | Ellis | H04N 7/163 725/58 |
| 2005/0278389 | A1 | 12/2005 | Maze et al. | |
| 2006/0140584 | A1* | 6/2006 | Ellis | G11B 27/005 386/238 |
| 2007/0157281 | A1* | 7/2007 | Ellis | H04N 7/17309 725/134 |
| 2008/0134258 | A1 | 6/2008 | Goose et al. | |
| 2009/0060468 | A1* | 3/2009 | Carlberg | H04N 7/17318 386/297 |
| 2009/0119455 | A1 | 5/2009 | Kisel et al. | |
| 2009/0133069 | A1* | 5/2009 | Conness | H04N 5/44543 725/46 |
| 2009/0133078 | A1* | 5/2009 | Hamano | H04N 5/76 725/87 |
| 2010/0086277 | A1* | 4/2010 | Craner | H04N 5/76 386/278 |
| 2010/0250593 | A1 | 9/2010 | Matsuo | |
| 2010/0332560 | A1* | 12/2010 | Gerbasi, III | G11B 27/034 707/812 |
| 2010/0333161 | A1* | 12/2010 | Chen | H04N 7/17318 725/120 |
| 2011/0078717 | A1* | 3/2011 | Drummond | H04N 21/4586 725/14 |
| 2011/0099228 | A1 | 4/2011 | Smith | |
| 2011/0126245 | A1* | 5/2011 | Chen | H04N 21/2181 725/93 |
| 2011/0164175 | A1* | 7/2011 | Chung | H04N 21/4126 348/468 |
| 2012/0079543 | A1 | 3/2012 | Zhou et al. | |
| 2012/0297432 | A1 | 11/2012 | Zhou et al. | |

FOREIGN PATENT DOCUMENTS

| | | |
|---|---|---|
| CN | 102378065 A | 3/2012 |
| CN | 102695024 A | 9/2012 |
| CN | 103024443 A | 4/2013 |
| TW | 286461 | 9/1996 |
| TW | 321765 | 12/1997 |
| TW | 201006180 A | 2/2010 |
| WO | WO-0154118 A1 | 7/2001 |
| WO | WO-2008064356 A1 | 5/2008 |

OTHER PUBLICATIONS

Lee et al., P2Proxy: Peer-to-Peer Proxy Caching Scheme for VOD Service, IEEE Sixth International Conference on Computational Intelligence and Multimedia Applications (ICCIMA'05), 2005, pp. 272-277.

Li et al., Towards Health of Replication in Large-Scale P2P-VoD Systems, IEEE Performance Computing and Communications Conference (IPCCC), 2009, pp. 323-330.

Zhou et al., On Replication Algorithm in P2P VoD, IEEE/ACM Transactions on Networking, vol. 21, No. 1, Feb. 2013, pp. 233-243.

Huang et al., The effects of replication on the QoS in P2P VoD systems, The 4th IET International Conference on Wireless, Mobile & Multimedia Networks (ICWMMN 2011), 2011, pp. 270-273.

Feng, A Novel Caching Mechanism for P2P Video-on-Demand Systems, Second International Conference on Future Generation Communication and Networking, vol. 1, 2008, pp. 140-143.

Miao et al., Scalable Proxy Caching of Video Under Storage Constraints, IEEE Journal on Selected Areas in Communications, vol. 20, No. 7, Sep. 2002, pp. 1315-1327.

Tewari et al., Proportional Replication in Peer-to-Peer Networks, Proceedings of the 25th IEEE International Conference on Computer Communications. (INFOCOM 2006), 2006, pp. 1-12.

Taiwan Patent Office, Notice of Allowance, Patent Application No. TW102140172, dated Dec. 31, 2015, Taiwan, R.O.C.

China Patent Office, Office Action dated Apr. 13, 2017.

* cited by examiner

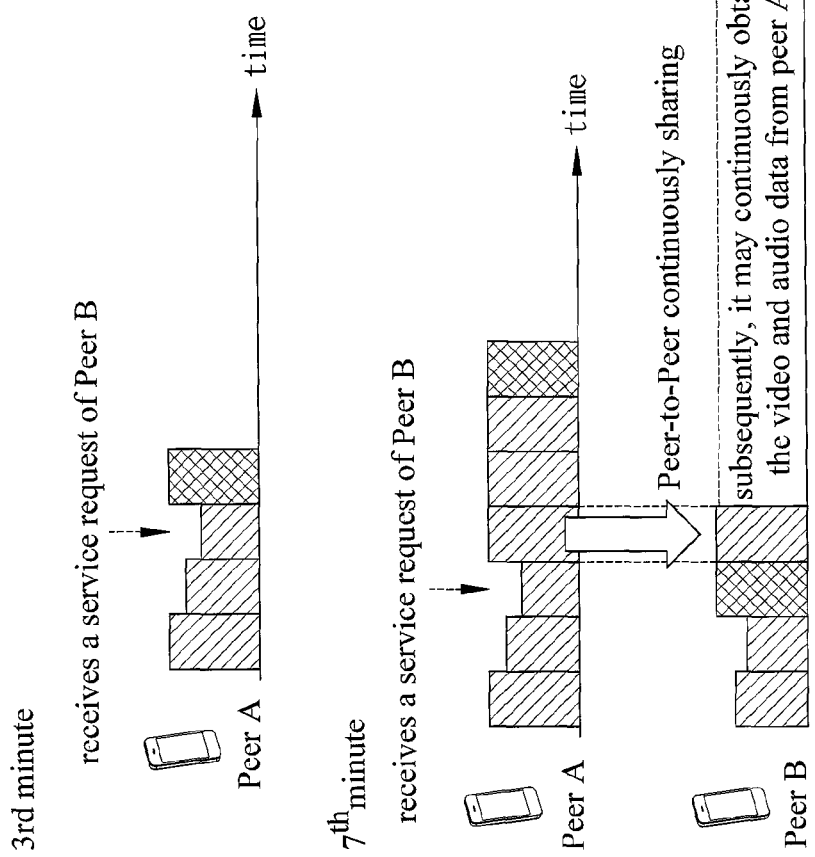

METHOD AND DEVICE OPERABLE TO STORE VIDEO AND AUDIO DATA

CROSS-REFERENCE TO RELATED APPLICATION

The present application is based on, and claims priority from, Taiwan Patent Application No. 102140172 filed Nov. 5, 2013, the disclosure of which is hereby incorporated by reference herein in its entirety.

TECHNICAL FIELD

The present disclosure generally relates to a method and device operable to store video and audio data.

BACKGROUND

Online video streaming through internet become one of network applications as the advance of bandwidth and video compression technology. For example, in large-scale and high-quality video/audio service applications, Master/Slave architecture is used to provide video streaming service, or a peer-to-peer (P2P) architecture is used to store and share information between peers. Online video service technology provides two service modes, one is the live broadcasting mode, the other is video on demand (VoD) mode.

When using P2P architecture to provide live broadcasting services, due to the timings for peers watching video content are similar, each of peers may not need to store large amount of video for each sending, receiving, and exchanging of video/audio data content, so as to achieve the effect of data sharing among peers. When using P2P architecture to provide a VoD service, each peer may view different video/audio content at different time, that is, each peer requires different video and audio data at different time. Therefore, each peer stores more video and audio data that have been viewed, and the opportunity of sharing each own video and audio data between peers is also relatively higher. For video and audio data that have not been stored and shared, the peer may grab the desired video and audio data from a video server. However, the loading amount of the video server will be increased.

In applications of using P2P architecture to provide VoD services, more and more users use VoD services through a lightweight device (such as smart phone, tablet PC, set-top box (STB), etc.). In the environment of using P2P architecture to provide VoD services, when a single peer is a lightweight device, the storage space in the single peer is limited and usually has a small capacity, and may not store the video and audio data having a large amount or been viewed, so that the single peer is less likely to become a data provider for the P2P network. Therefore, the P2P sharing rate of the video and audio data among peers is relatively low, and the loading of a server providing the video and audio data source is more likely increased.

For transmission and sharing of VoD among peers, the existing technologies may usually cut the video and audio data into small blocks. Then peer(s) gradually grabs video and audio data to be viewed from a server or other peers. The video and audio data stored in each peer may, based on the time whether to view, include such as the video and audio data which are already down-streamed and completely stored, or the video and audio data which are partially stored, or the video and audio data that have been deleted partial stored video and audio data. Under a situation that a peer does not have an enough storage space, a technique may calculate the bandwidth gap via the global information of a P2P VoD service environment, such as a movie playback rate (PBR), an aggregation service rate (ASR), a movie request rate/movie popularity, a total number of peers in the video and audio streaming system, and so on, to determine whether the peer stores the video and audio data. So that the video and audio data content stored in each peer may achieve the P2P sharing effect, and reduce the loading of the server.

Users may use VoD services via at least one peer (such as a lightweight device) and this is becoming more popular. It may use a dynamically adjustable storing probability to determine whether the video and audio data to be stored in the storage space of a peer. And this storing probability may be dynamically adjustable according to the timing point of sharing the video and audio data required by a demand peer, or the bit rate of the video and audio data, or the storage space of peer, so that for each peer with a limited storage space, the stored video and audio data may achieve a P2P sharing effect. This may be one of many ways to increase the P2P sharing rate of the video and audio data, and may reduce the loading of the server.

SUMMARY

The exemplary embodiments of the disclosure may provide a method and device operable to store video and audio data.

One exemplary embodiment relates to a method operable to store video and audio data, and the method is adapted to a first peer of a video and audio data system having a plurality of peers with each peer having a corresponding storage space. The method may comprise: before a first peer has not received a service request of a second peer of the plurality of peers, determining whether at least a video and audio data received by the first peer is stored in its corresponding storage space by using a first video and audio storing probability that is dynamically adjustable, and extending a time interval of the first peer for storing received video and audio data; and when the first peer receives the service request of the second peer, setting a second video and audio storing probability, thereby the second peer obtaining at least one stored video and audio data from the first peer.

Another exemplary embodiment relates to a device operable to store video and audio data, and the device is adapted to a first peer of a video and audio data system having a plurality of peers. This device may comprise a hardware processor and a storage medium. The hardware processor performs: before a first peer has not received a service request of a second peer of the plurality of peers, determining whether at least a video and audio data received by the first peer is stored in the storage medium by using a first video and audio storing probability that is dynamically adjustable, and extending a time interval of the first peer for storing received video and audio data; and when the first peer receives the service request of the second peer, setting a second video and audio storing probability, thereby the second peer obtaining at least one stored video and audio data from the first peer.

BRIEF DESCRIPTION OF THE DRAWINGS

FIG. 10A and FIG. 10B shows another exemplar illustrating the second peer shares the video and audio data of the first peer in two different cycles, respectively, according to another exemplary embodiment.

DETAILED DESCRIPTION OF DISCLOSED EMBODIMENTS

Figure 1:
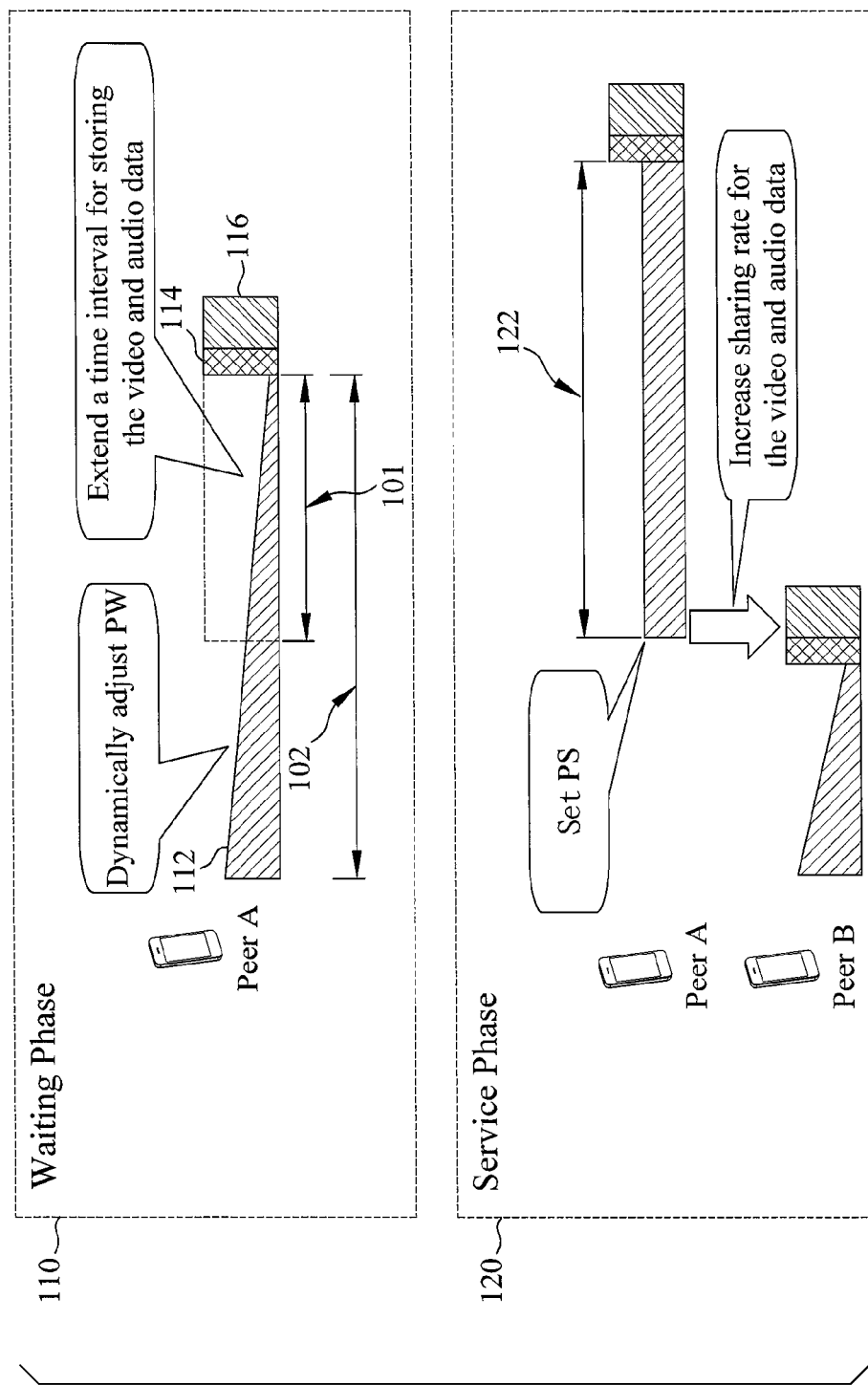
FIG. 1 shows a schematic view illustrating the storage control of video and audio data by using a dynamically adjustable storing probability in an application environment of a video and audio data system, according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide a technique of dynamical adjusting the storing probability according to the storage space of a demand peer (such as a smart phone, a tablet PC, a set-top box, or other lightweight device), the multimedia bit rate, and the service request status of the demand peer. Under the conditions of a limited storage space, this technique may effectively extend stored video and audio data interval of a peer, to increase the sharing opportunities of the peer; and after this peer receives a service request from a demand peer, the P2P sharing rate of VoD video and audio data is increased. While the VoD video and audio data sharing applied on a P2P network is an exemplary application of the technique. In a true scope of the disclosure, this video and audio data storage technology may be applied on various types of network environments, but not limited to P2P network environment(s).

In an application environment of managing video and audio data, a demand peer may receive the video and audio data from other peer(s) or a server. When a peer has a limited storage space, a mechanism of storage control for the video and audio data is needed to determine whether the received video and audio data is stored in the storage space of this peer. FIG. 1 shows a schematic view illustrating the storage control for video and audio data by using a dynamically adjustable storing probability in an application environment of a video and audio data system, according to an exemplary embodiment. In the application environment of the video information system, such as video and audio data may be cut into small blocks for transmission and sharing. Each peer (e.g., peer A) stores viewed video and audio data for one or more subsequent sharing peers that may gradually grab the video and audio data to be viewed from at least one server or other peer(s). Each peer may also be a sharing peer, may issue a sharing request to the server or other peers, and may gradually grab video and audio data to be viewed. In other words, the video and audio data of each peer on the timeline may be the video and audio data that have been stored or viewed 112, or the video and audio data under playing 114, or the video and audio data under grabbing 116.

As showed in FIG. 1, when a peer (e.g., peer A) is in a waiting phase 110 (i.e., the peer has not yet received a service request from any demand peer), the peer may dynamically adjust a video and audio store probability PW in the waiting phase 110, to extend a time interval for storing the video and audio data, i.e., extend from a time interval 101 to another time interval 102 for increasing the chance of a demand peer requesting the video and audio data in this time interval 102. When the peer receives the service request from any demand peer (for example peer B), peer A enters a service phase (i.e., receives a service request from other peer) 120, and sets a video storing probability PS of the service phase and extends the time interval 101 to the time interval 122 for storing the video and audio data. Therefore peer B may obtain the video and audio data from peer A to increase the P2P sharing rate of the video and audio data. The video and audio storing probability of the waiting phase PW and the video and audio storing probability of the service phase PS are two probabilities for storing the video and audio data, and both are less than or equal to 1 and greater than or equal to 0. That is, according to an exemplary embodiment, these probabilities are used to determine whether the video and audio data received by a peer may be stored in a limited storage space of the peer.

Figure 2:
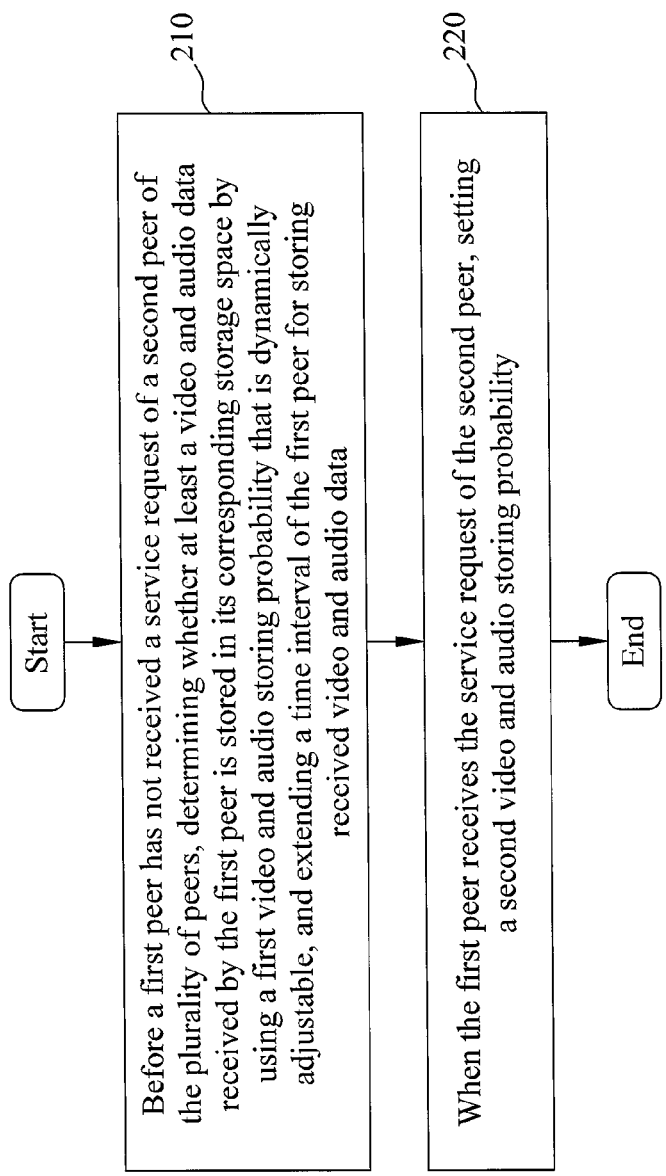
FIG. 2 shows a method operable to store video and audio data, according to an exemplary embodiment.

FIG. 2 shows a method operable to store video and audio data, according to an exemplary embodiment. And this method may be adapted to a first peer of a video and audio data system having a plurality of peers, with each peer having a corresponding storage space. As shown in FIG. 2, before the first peer has not received a service request of a second peer of the plurality of peers, the first peer determines whether the video and audio data received by the first peer is stored in a storage space corresponding to the first peer with a first video and audio storing probability that is dynamically adjustable, and extends a time interval of the first peer for storing received video and audio data, as shown in step 210. When the first peer receives the service request from the second peer, sets a second video and audio storing probability, as shown in step 220. Thereby the second peer may obtain at least one stored video and audio data from the first peer. In a true scope of the disclosure, this method operable to store video and audio data may be applied on various types of network environments.

This method for example may be performed by a hardware processor of the first peer. The storage space of the first peer is for example, but not limited to a storage media in the first peer. The processor and the storage medium is for example, but not limited to a storage module components of a plurality modules in the first peer. This first peer is, for example, but not limited to a light weight device with a limited storage space.

Figure 3:
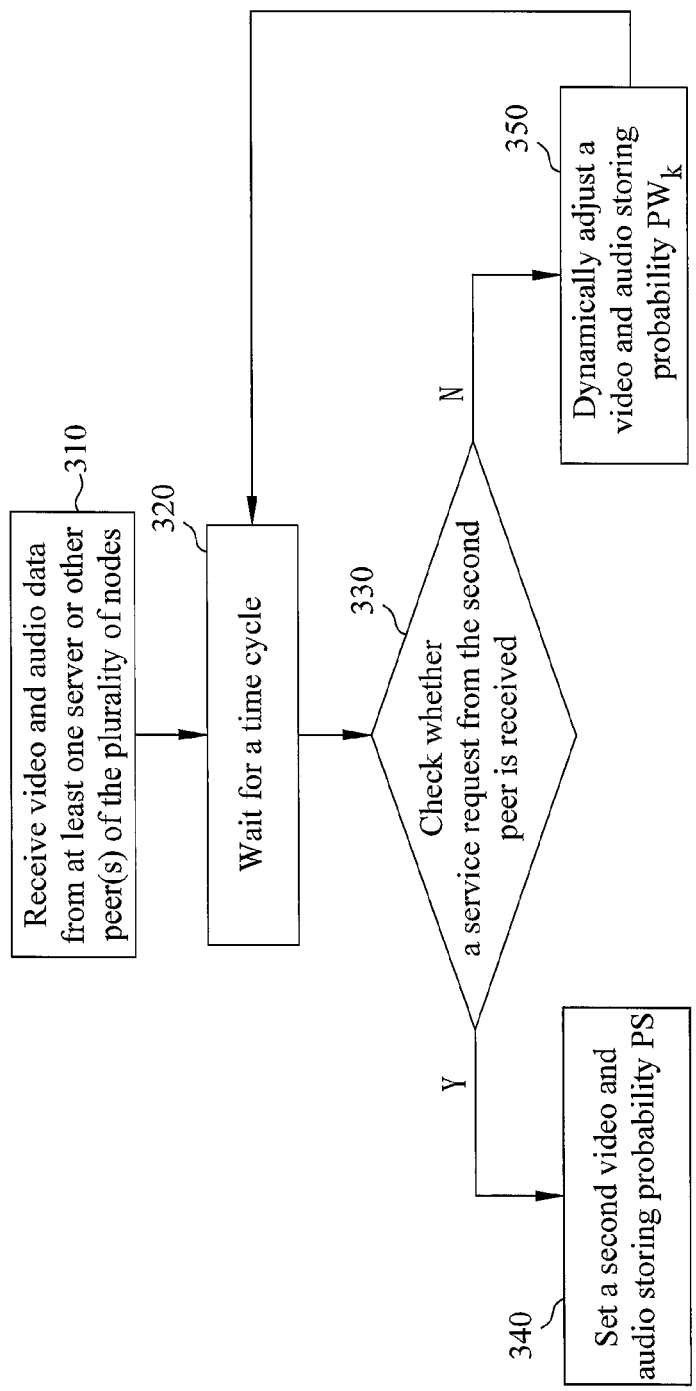
FIG. 3 shows the operation of a first peer in FIG. 2 in a waiting phase and in a service phase, respectively, according to an exemplary embodiment.

Accordingly, according to an exemplary embodiment of FIG. 3, before the first peer has not received a service request from a second peer of the plurality of peers, the first peer may receive video and audio data from at least one server or other peer(s) of the plurality of peers (step 310). The first peer waits for a time cycle (step 320), and checks whether a service request from the second peer is received (step 330). When the first peer receives the service request from the second peer, enters into a service phase. During a service cycle in the service phase, the first peer sets a second video and audio storing probability, denoted as the video and audio storing probability PS (step 340); and extends a time interval for storing the video and audio data received by the first peer, so that the second peer may obtain at least one video and audio data desired to share from the first peer. When the first peer does not receive the service request from the second peer, the first peer is in a waiting phase. In this waiting phase, the first peer dynamically adjusts a video and audio storing probability $PW_k$ (step 350); the video storing probability $PW_k$ represents a video and audio data storing probability of a $k^{th}$ waiting cycle in the waiting phase. That is, when the first peer does not receive a service request from the second peer, the first peer in a waiting cycle adjusts the video and audio data storing probability, and the process returns to step 320 to continuously wait for next waiting cycle to check whether a service request is received from other peer of the plurality of peers.

Figure 4:
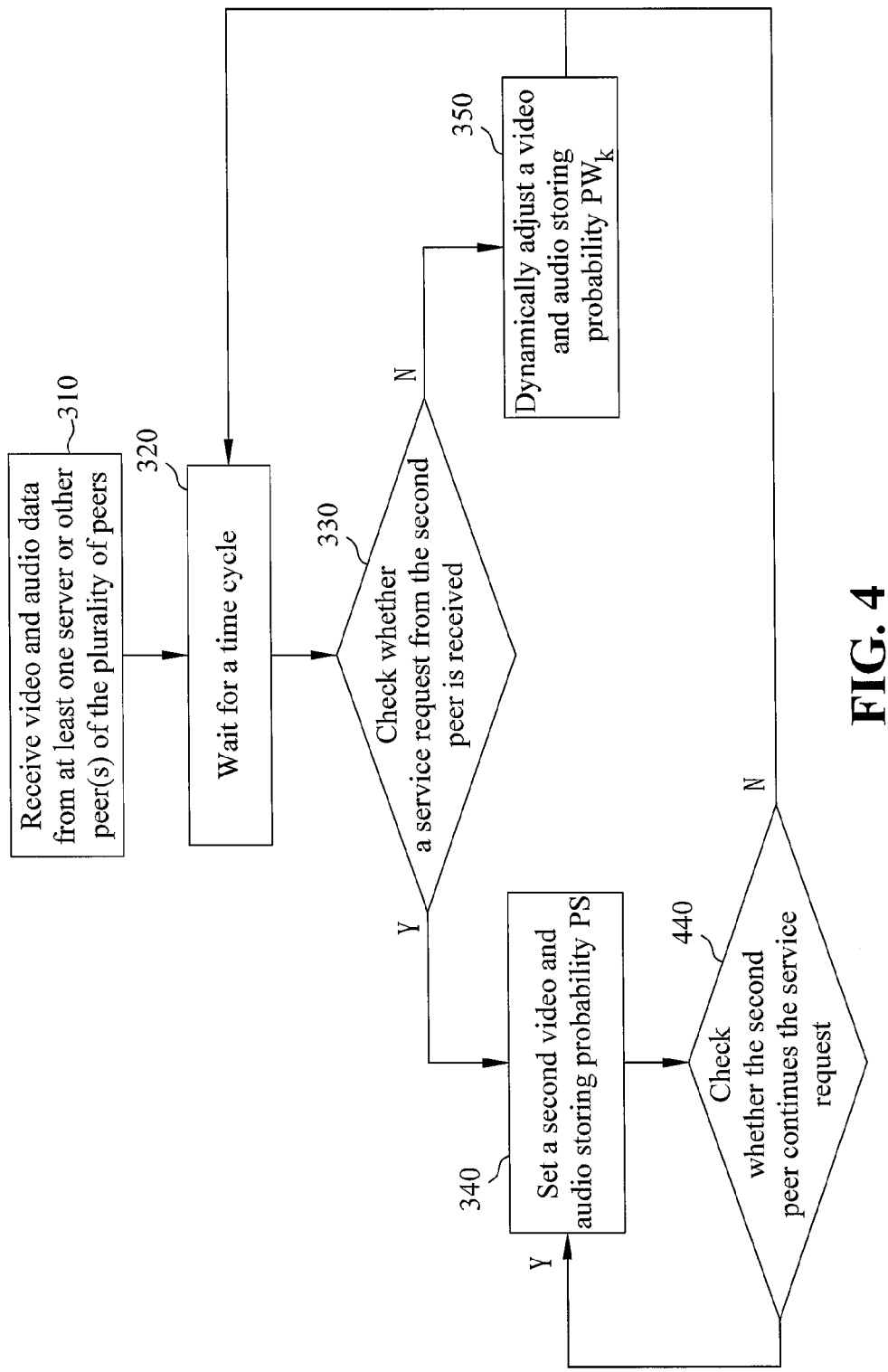
FIG. 4 shows the operation whether the second peer in FIG. 3 continues the service request, according to an exemplary embodiment.

FIG. 4 shows the operation whether the second peer in FIG. 3 continues the service request, according to an exemplary embodiment. Referring to FIG. 4, following step 340, the first peer checks whether the second peer continues the service request (step 440). When the second peer continues the service request, the first peer returns to step 340. When the second peer does not continue the service request, the first peer returns to step 320.

The following may illustrate, according to exemplary embodiments, how the first peer in the waiting phase (i.e., has not received service request from other peers), dynamically adjusts the video and audio storing probability PW in the waiting phase; and in the service phase (i.e., received a service request from the second peer), how the first peer phase sets the video and audio storing probability PS in this service phase. Let $PW_k$ represent the video and audio storing probability of the $k^{th}$ waiting cycle of the first peer in the waiting phase, $0 \le PW_k \le 1$, and $PW_k = PW_{k-1} \times \alpha$, $0 \le \alpha \le 1$. In other words, the waiting phase includes at least one waiting cycle, and in each waiting cycle, the first peer may use a parameter $\alpha$, $0 \le \alpha \le 1$, to adjust the first video and audio storing probability; such as using a common ratio $\alpha$, $0 \le \alpha \le 1$, to adjust the first video and audio storing probability. Let RM be a video and audio data bit rate, assuming the unit is kilobits per second (kbps), TW is a waiting cycle, and the unit may be second or minute. After each cycle the first peer checks whether there is a demand peer such as the second peer, to request service(s). Let TS be a service interval, and this TS service interval is the difference between the playing time point of the latest data in the storage space of the first peer and the playing time point of the stored data of the first peer requested by the second peer. Let S be a storage space used by the first peer, assuming the unit is MB, i.e. $10^6$ bytes. In the disclosure, a limited storage space for a peer is represented by SMAX.

Figure 5A:
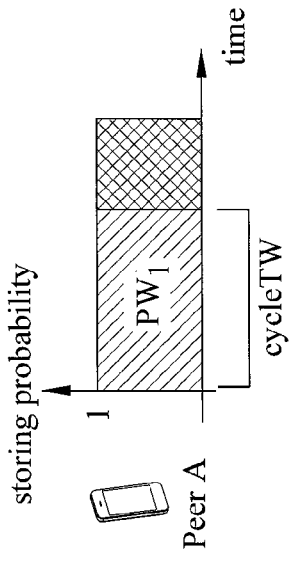
FIG. 5A shows a scenario of the first peer storing video and audio data at the first cycle in the waiting phase, according to an exemplary embodiment.

FIG. 5A shows a scenario of the first peer storing video and audio data at the first cycle in the waiting phase, according to an exemplary embodiment. In the exemplary embodiment of FIG. 5A, the video and audio storing probability $PW_1$ of the first waiting cycle for the first peer in the waiting phase is equal to 1; and the storage space S used by the first peer in the first waiting cycle equals to $PW_1 \times RM \times TW$. For example, when RM equals to 2048 kbps and TW equals to one minute, the storage space S used by the first peer in the first waiting cycle equals to $(1 \times 2048 \text{ kbps} \times 60 \text{ s})/8$ bits, i.e. 15360 (bytes) or 15.36 MB. A storage bit rate of the first waiting cycle is $PW_1 \times RM$, i.e. $1 \times 2048$ kbps, which is defined as a video and audio bit rate of the video and audio data stored by the first peer in its storage space in the first waiting cycle. Since the stored video and audio data may be shared to the second peer, the storage bit rate also equals to the P2P sharing rate. The terms "storage bit rate" and "P2P sharing rate" will be used interchangeably in this disclosure.

Figure 5B:
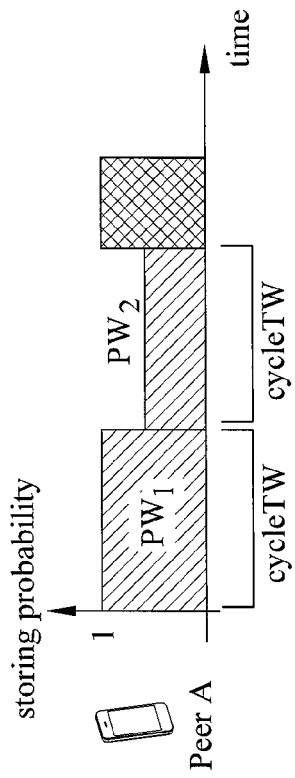
FIG. 5B shows a scenario of the first peer storing video and audio data at the second cycle in the waiting phase, according to an exemplary embodiment.
Figure 5C:
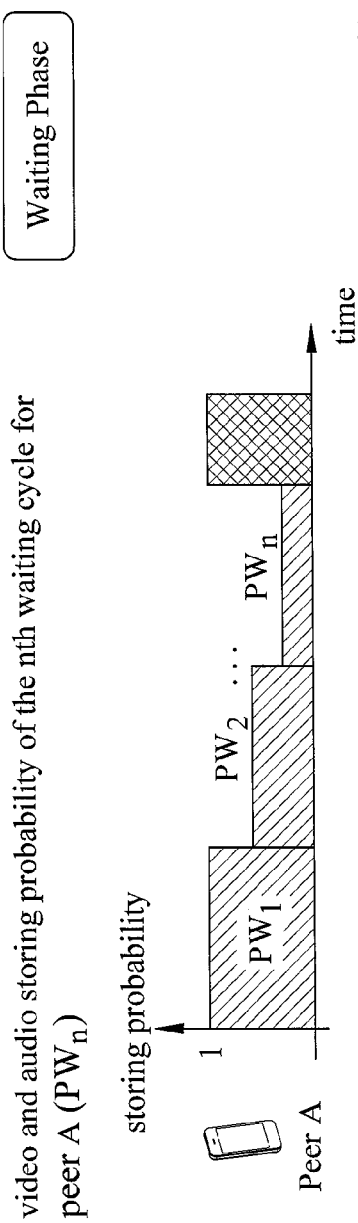
FIG. 5C shows a scenario of the first peer storing video data peer at the n cycle, according to an exemplary embodiment.

FIG. 5B shows a scenario of the first peer storing video and audio data at the second cycle in the waiting phase, according to an exemplary embodiment, wherein assuming $PW_2 = PW_1 \times \alpha$, $0 \le \alpha \le 1$. For example, when $\alpha = 0.8$, $PW_2 = 1 \times 0.8 = 0.8$, and the storage space S used by the first peer in the second waiting cycle is calculated as $S = PW_1 \times RM \times TW + PW_2 \times RM \times TW = 15.36 \text{ MB} \times (1+0.8) = 27.8$ MB. Accordingly, FIG. 5C shows a scenario of the first peer storing video data peer at the $n^{th}$ cycle, according to an exemplary embodiment. In the exemplar of FIG. 5C, the used storage space S of the first peer in the $n^{th}$ cycle may use a geometric series formula to calculate as follows:

$$S = \sum_{k=1}^{n} (PW_k \cdot RM \cdot TW)$$
$$= \frac{PW_1(1-\alpha^n)}{1-\alpha} \cdot RM \cdot TW$$

Figure 6:
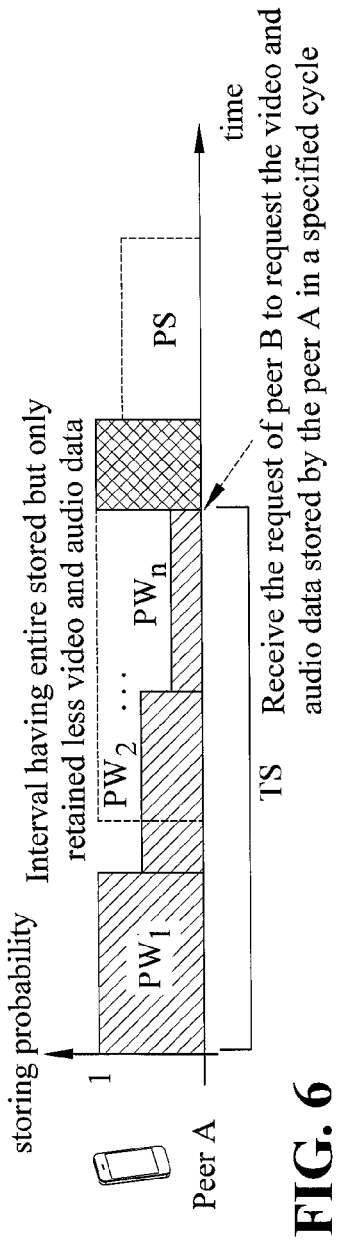
FIG. 6 shows a scenario of the first peer receiving a service request of the second peer during the $(n+1)^{th}$ cycle, wherein assuming the service request of the second peer is to request the stored video and audio data of the first peer at a first cycle, according to an exemplary embodiment.

According to the step 220 in FIG. 2, when the first peer receives a service request from the second peer in the $(n+1)^{th}$ cycle, it sets a second video and audio storing probability, i.e., the video storing probability PS. The decision of the video and audio storing probability PS relates to a time point of the request from the demand peer (the second peer), a video and audio data bit rate, and a storage space limitation of the first peer. FIG. 6 shows a scenario of the first peer (e.g., peer A) receiving a service request of the second peer (e.g., Peer-B) during the $(n+1)^{th}$ cycle, wherein assuming the service request of the second peer is to request the stored video and audio data of the first peer in a first cycle, according to an exemplary embodiment. Referring to the scenario of FIG. 6, the service interval TS means a time length between two time points, and this time length is the difference between two time points, wherein one time point is the playing time point of latest data in the storage space of the first peer, and the other time point is the playing time point of stored data in a specified cycle of the first peer, wherein the playing time point is requested by the second peer.

Figure 7:
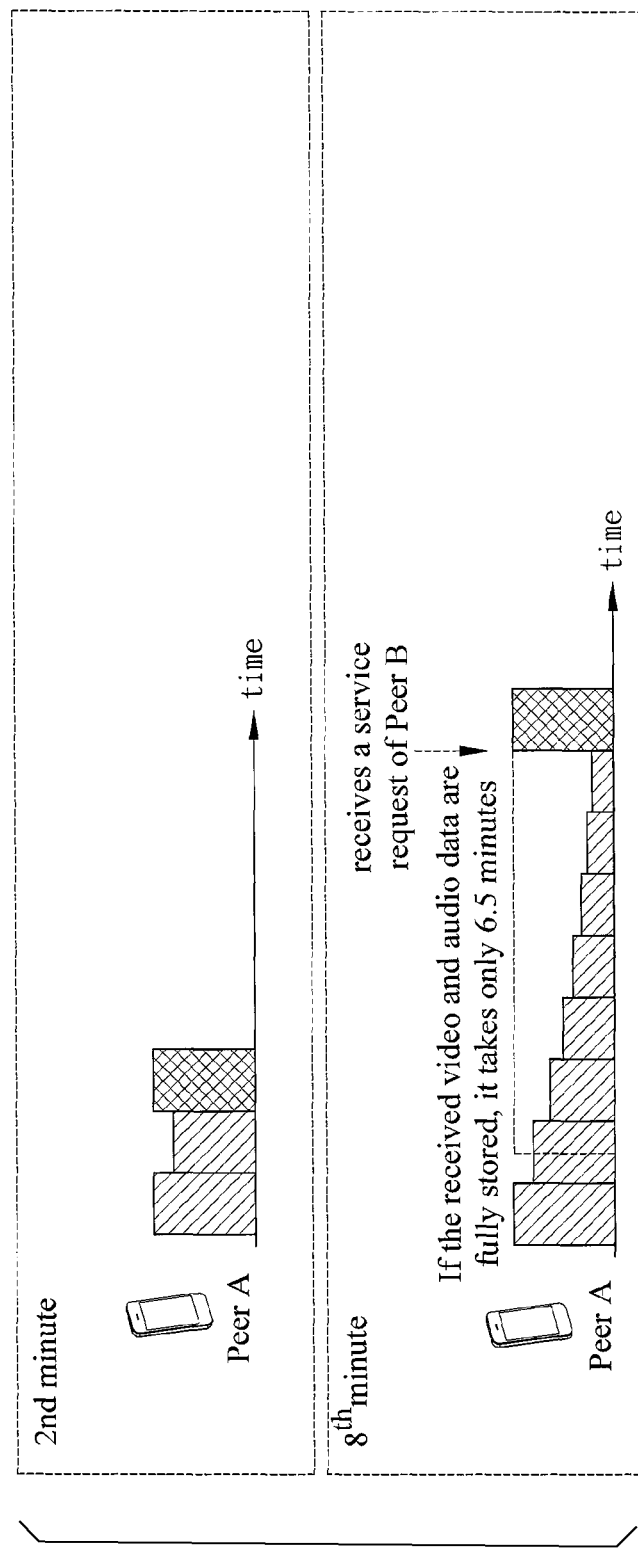
FIG. 7 shows that during the waiting phase from the second cycle to the $n^{th}$ cycle, the first peer dynamically adjusts its video and audio storing probability, and only fewer audio and video data are retained, according to an exemplary embodiment.

According to an exemplary embodiment, the first peer dynamically adjusts the video and audio data storing probability in the second cycle to the $n^{th}$ cycle of the waiting phase, wherein only fewer video and audio data are retained. For example, in the scenario of FIG. 7, wherein n is equal to 8. In FIG. 7, it is assumed that RM equals to 2048 kbps, and a cycle TW equals to one minute. The first peer (e.g., peer A) in each waiting cycle from the second cycle to the eighth cycle, dynamically adjusts the video and audio storing probability with $PW_k=(0.8)^{k-1}$, $2 \le k \le 8$; when the first peer at the eighth minute, the video and audio storing probability $PW_k=(0.8)^7=0.21$, the storage bit rate is 0.21× 2048 kbps=430 kbps, and the used storage space S is equal to 63.9 MB. This storage space S is less than the storage space limitation SMAX (equals to 100 MB) of the first peer. In other words, for each waiting cycle from the second cycle to the $n^{th}$ cycle, since the first peer dynamically reduces the video and audio storing probability, only fewer video and audio data are retained. If the first peer in each waiting cycle fully stores the received video and audio data into the storage space S, then the storage space S can store the received video and audio data for only (100 MB/15.36 MB) cycles, or 6.5 minutes, according to the storage space limitation (equal to 100 MB) of the first peer.

When the first peer during the $(n+1)^{th}$ cycle receives a service request from the second peer, the first peer, during the $(n+[TS/TW])^{th}$ cycle, may refer to such as the service interval TS, the video and audio data bit rate RM, and the storage space limitation SMAX of the first peer, to set the second video and audio storing probability (video and audio storing probability PS) as following:

$$PS=SMAX/(TS \times RM), \text{ and } 0 \le PS \le 1.$$

In other words, the second video storing probability may be decided based on a service interval, a video and audio data bit-rate, and a storage space limitation. For example, when the SMAX is equal to 100 MB, n is equal to 8, TS=480 s, the video and audio storing probability may be calculated as PS=100 MB/[480×(2048 k/8)B] according to the above formula. The value of video and audio storing probability PS is approximately 0.813.

Figure 8:
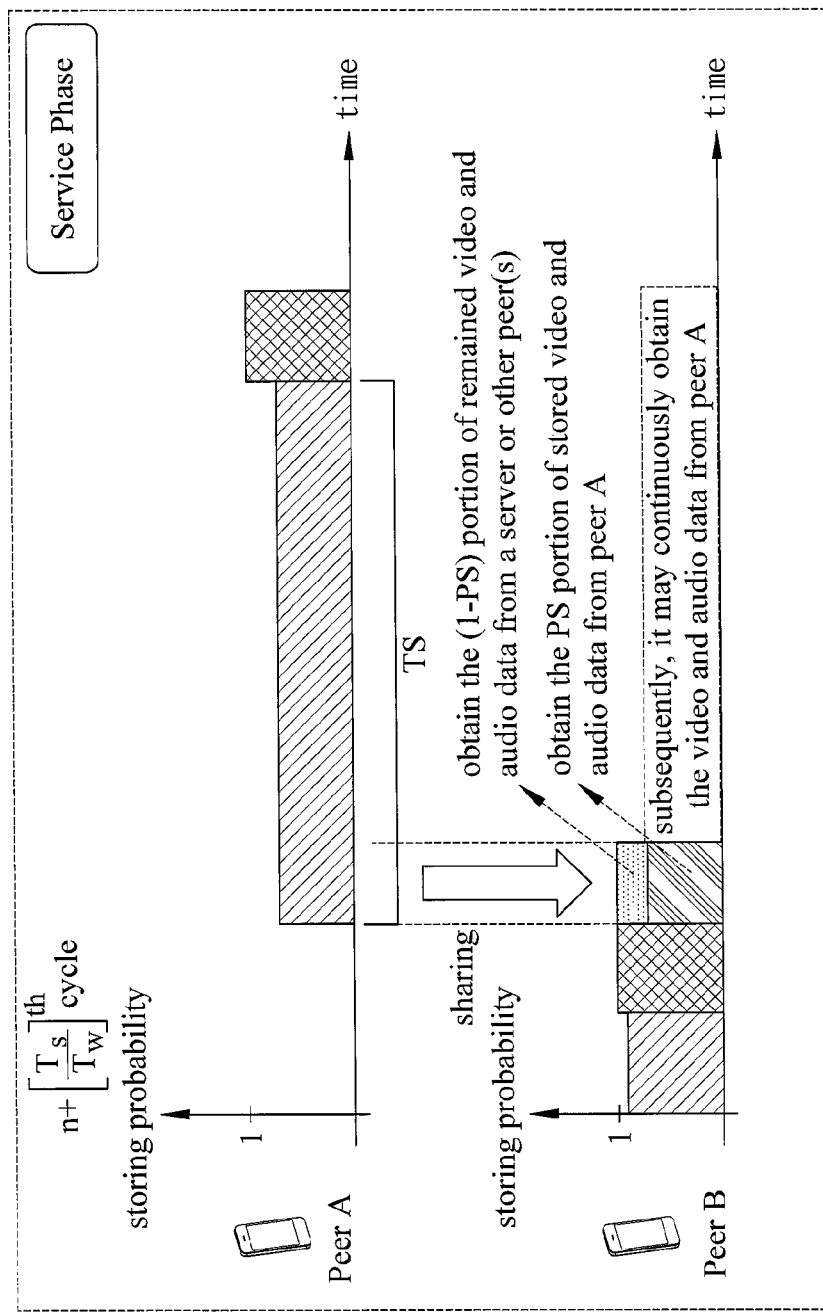
FIG. 8 shows an exemplary scenario illustrating the video and audio storage probabilities of the first and the second peers and the video and audio data management, during the cycle that the first peer enters the service phase, according to an exemplary embodiment.

The first peer sets the video and audio storing probability PS, and enters into the service phase since the $(n+[TS/TW])^{th}$ cycle. Thereby the second peer may obtain from the first peer the shared video and audio data stored by the first peer in the first cycle. FIG. 8 shows an exemplary scenario illustrating the video and audio storage probabilities of the first peer (e.g., peer A) and the second peer (e.g., peer B) and the video and audio data management, during the cycle that the first peer enters the service phase, according to an exemplary embodiment. Referring to the scenario of FIG. 8, in the $(n+[TS/TW])^{th}$ cycle, the first peer enters into the service phase, sets video storing probability PS, and extends a time interval for storing the video and audio data; while the second peer may obtain the PS portion of stored video and audio data from the first peer in the first cycle, and obtain the (1-PS) portion of remained video and audio data from a server or other peers. Subsequently, the second peer may continuously obtain video and audio data from the first peer. Accordingly, for each peer with a limited storage space, the effect of sharing the contents of the stored video and audio data may be achieved.

Figure 9A:
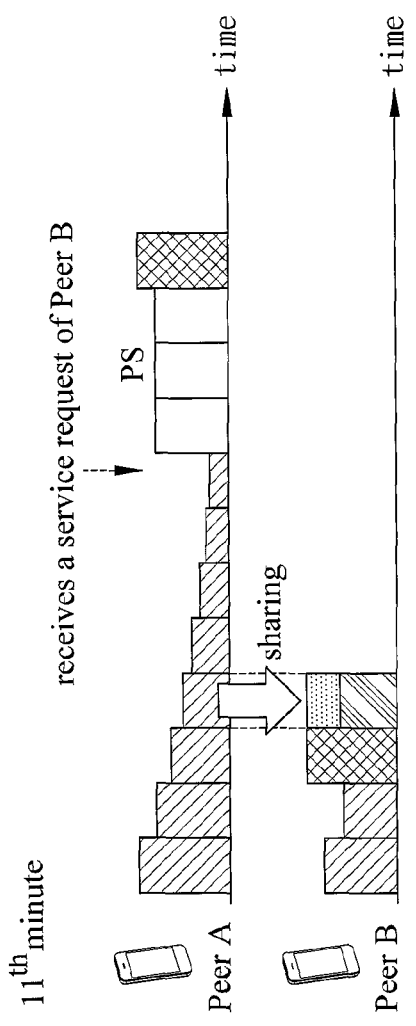
FIG. 9A and FIG. 9B show an exemplar illustrating the second peer shares the video and audio data of first peer in two different cycles, respectively, according to an exemplary embodiment.
Figure 9B:
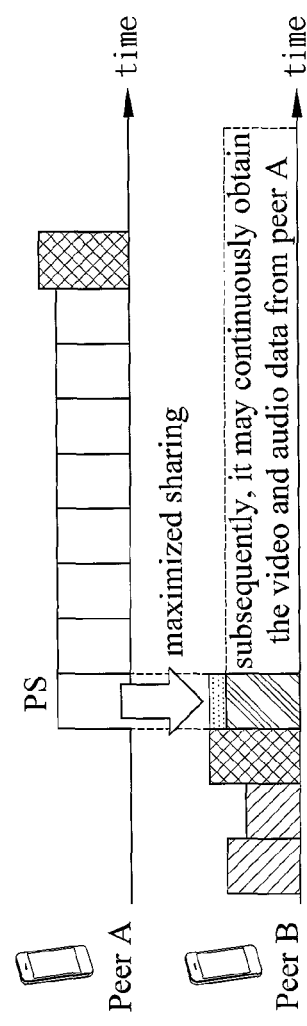

FIG. 9A and FIG. 9B show an exemplar illustrating the second peer (e.g., peer B) shares the video and audio data of first peer (e.g., peer A) in two different cycles, respectively, according to an exemplary embodiment. FIG. 9A shows an exemplary scenario illustrating the first peer and the second peer in the $11^{th}$ cycle (min), that is the first peer received a service request from the second peer in the $8^{th}$ cycle, then sets the value of the video and audio storing probability PS to be 0.813, and in the $9^{th}$, $10^{th}$ and $11^{th}$ cycles the first peer continuously uses this video and audio storing probability PS. In the $11^{th}$ cycle the second peer shares the video and audio data stored by the first peer in the $4^{th}$ cycle. The storage bit rate of the first peer in the $4^{th}$ cycle is $PW_4 \times RM=(0.8)^{4-1} \times 2048$ kbps, namely 1048 kbps. To receive the complete video and audio data, the second peer may obtain the remaining $1-PW_4$ portion of video and audio data from a server or other peers. When the P2P sharing rate is 1048 kbps, a video and audio bit rate for the remaining video and audio data, namely a remaining bit rate, is 1000 kbps, i.e., RM-1048 kbps. Thus, the second peer may request the remaining video and audio data with the remaining bit rate to a server or other peers. In this case, the server bears a transmission bit rate 1000 kbps, defined as a video and audio bit rate for transmitting the remaining video and audio data of the second peer. This transmission bit rate may be treated as the highest burden amount of the server.

FIG. 9B shows an exemplary scenario illustrating the first peer and the second peer in the $17^{th}$ cycle (min), that is the first peer received a service request from the second peer after the $8^{th}$ cycle to set the value of video and audio storing probability PS to be 0.813, and in each cycle from $9^{th}$ cycle to $16^{th}$ cycle the first peer continuously uses the video and audio storing probability PS. In the $17^{th}$ cycle the second peer shares the video and audio data stored by the first peer in the $9^{th}$ cycle. The storage bit rate of the first peer in the $9^{th}$ cycle is $PS \times 2048$ kbps, namely 1655 kbps. When the P2P sharing rate is 1655 kbps, the remaining bit rate is 383 kbps, i.e., RM-1655 kbp, is required to obtain from a server. Thus the server bears the transmission bit rate 383 kbps. In other words, in the $17^{th}$ cycle the second peer shares the video and audio data stored by the first peer in the $9^{th}$ cycle, that achieves the maximum P2P sharing rates. Therefore, from the $17^{th}$ cycle, the second peer may continuously obtain the PS portion of the video and audio data from the first peer, and obtain the remaining (1-PS) portion (the remaining video and audio data with 383 kbps in this case) of the video and audio data from a server or other peers.

In the waiting cycle from the second cycle to the $n^{th}$ cycle, if the used storage space S is more than a storage space limitation SMAX, for example, it may delete the oldest video data blocks from the storage space, or just store less video and audio data. Following the above exemplary embodiments, in the waiting cycle from the second cycle to the $n^{th}$ cycle, the first peer dynamically adjusts the video storing probability $PW_k$, $0 \le k \le n$; for example, the first peer may use the geometric formulas $PW_k=PW_{k-1} \times \alpha$, wherein $0 \le \alpha \le 1$. This design approach is used to retain fewer video and audio data. The following further illustrates the adjustment of the video storing probability $PW_k$ and the design of a in the waiting phase.

One way to design α may use the formula to calculate the length of time interval for storing the video and audio data. According to the geometric formulas for the video and audio storing probability in the waiting phase $PW_k=PW_{k-1} \times \alpha$, $0 \leq \alpha \leq 1$, the use of the geometric formula for calculating a total sum may result in the size of the used storage space S of the first peer will converge to $PW_1(1-\alpha^n)/(1-\alpha)$. In the preceding example, α=0.8, and SMAX=100 MB. If the first peer follows the formula $PW_k=PW_{k-1} \times \alpha$, and limits the range of α with $0.05 \leq \alpha \leq 1$, then the stored video and audio data may use a storage space of 72.6 MB for 13 minutes. For the next $k^{th}$ cycle, the video and audio storing probability $PW_k$=0.05 and k>14, then the remaining 27.3 MB may be stored for 35 minutes. In other words, with the adjustment of the video and audio storing probability $PW_k$ and the design of a, the first peer may at least store video and audio data for 48 minutes.

Another design approach of α is to calculate used video and audio storing probability of each cycle by using the length of a time interval of the video and audio data to be stored. The design of the video and audio storing probability $PW_k$ and the α is that, let the video and audio storing probability $PW_k$ of the first peer in the waiting phase be a fixed value α, $0 \leq \alpha \leq 1$, then the first peer uses the formula calculating the video and audio storing probability in the service phase, PS=SMAX/(TM×RM), to store the received video and audio data, wherein TM is the time length of the video and audio data (unit is one second or one minute). In the exemplary embodiment of FIG. 9A and FIG. 9B, assuming that the video and audio data is a movie lasting for 120 minutes, then following the formula PS=SMAX/(TM×RM), the video and audio storing probability $PW_k$=100M Bytes/ (120×60×2048/8) Bytes=0.0542. In other words, when the video and audio data received by the first peer is a 120 minutes movie, the first peer may use the fixed value 0.0542 for the video and audio storing probability for every minute, to store the video and audio data of the movie for 120 minutes.

FIG. 10A and FIG. 10B shows another exemplar illustrating the second peer (e.g., peer B) shares the video and audio data of the first peer (e.g., peer A) in two different cycles, respectively, according to another exemplary embodiment. FIG. 10A shows a scenario of the first peer in the third cycle, that is, in the third cycle, the video and audio storing probability of the first peer $PW_3=(0.8)^2$=0.64, the storage bit rate=0.64×2048 kbps=1310 kbps, and the used storage space S is equal to 37.6 MB. The first peer receives a service request from the second peer after the third cycle. FIG. 10B shows a scenario of the first peer in the 7th cycle. That is, the first peer receives a service request from the second peer after the third cycle. Then the video and audio storing probability PS is set to 1, and the first peer in 4, 5, and 6 cycles continuously uses the set video and audio storing probability PS and the storage bit rate is 1×2048 kbps=2048 bps, and the used storage space S is equal to SMAX (i.e., 100 MB). In the 7th cycle the second peer shares the video and audio data stored by the first peer in the 4th cycle, and the storage bit rate of the first peer in the $4^{th}$ cycle is 2048 bps. Therefore, the P2P sharing rate is 2048 bps. In other words, the server bears the transmission bit rate of 0 kbps. This is the maximum P2P sharing of the second peer, so from the $7^{th}$ cycle the second peer may continuously obtain the video and audio data from the first peer, and the server does not bear any transmission bit rate.

Figure 11:
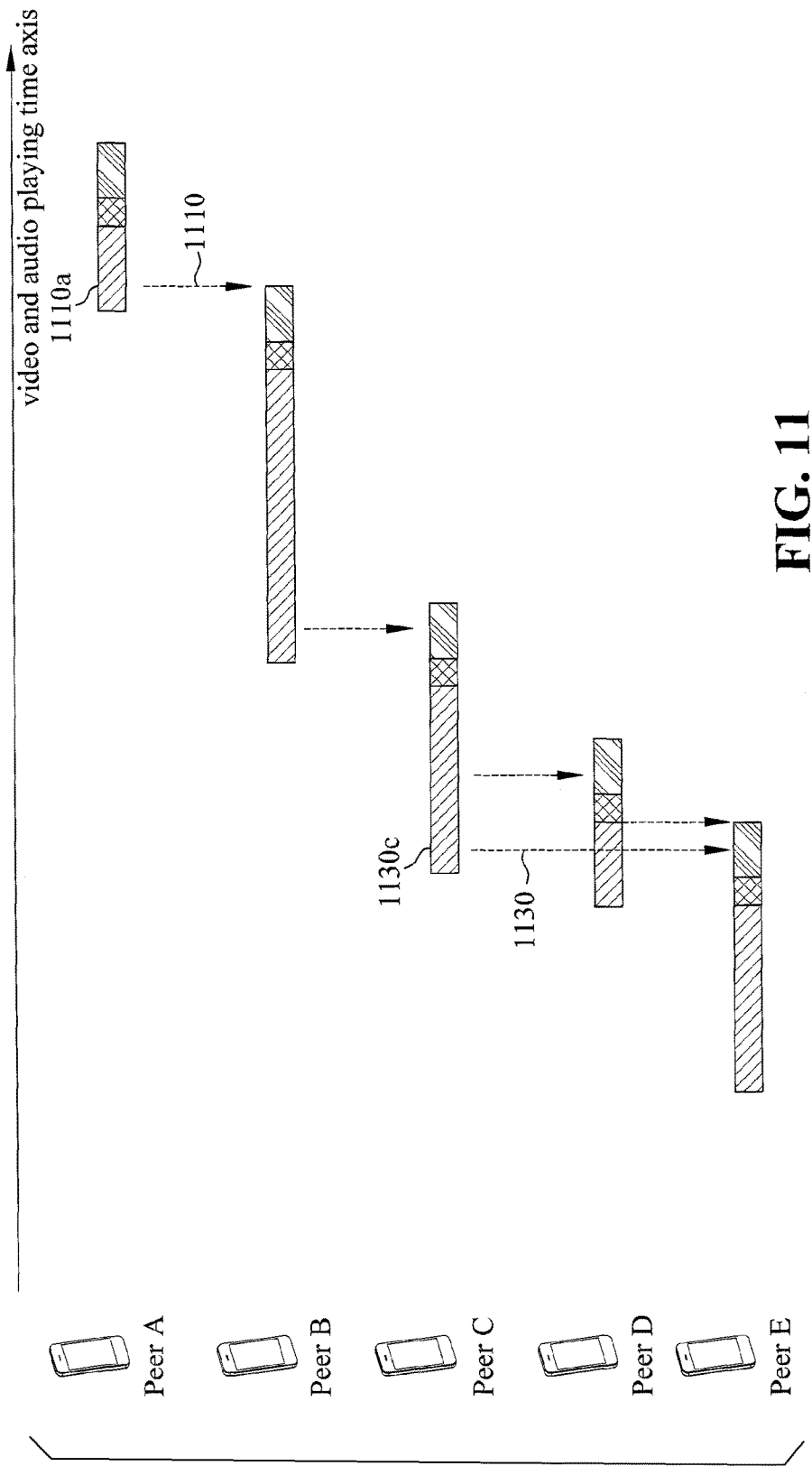
FIG. 11 shows the P2P management status of the video and audio data among a plurality of peers, according to an exemplary embodiment.

FIG. 11 shows the P2P management status of the video and audio data among a plurality of peers, according to an exemplary embodiment. In the FIG. 11, the plurality of peers are peers A~E, wherein each dotted line arrow represents the P2P video and audio data sharing. For example, a dashed arrow 1110 represents sharing the video and audio data 1110a of peer A to peer B; in other words, the peer B subsequently may obtain from peer A the video and audio data 1110a stored on peer A. A dashed arrow 1130 represents sharing the video and audio data 1130c of peer C to peer E; that is, the peer E subsequently may obtain from peer C the video and audio data 1130c stored on peer C. In other words, according to the exemplary embodiments of the present disclosure, the video and audio data storing technology provide a P2P video and audio data sharing service of a plurality of peers in a video and audio data system.

Figure 12:
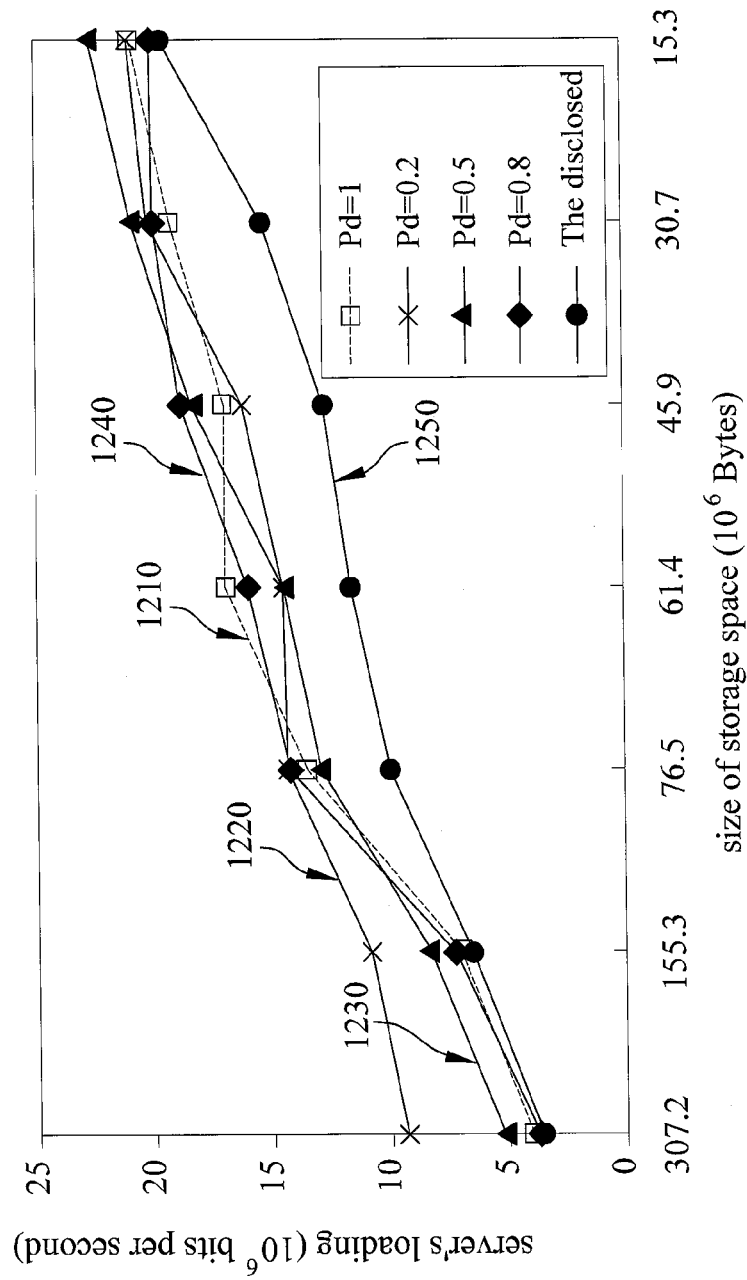
FIG. 12 shows a comparison chart of an experiment effect between multiple fixed video and audio storage probabilities and the dynamically adjustable the video and audio storing probability according to the exemplary embodiments, wherein the horizontal axis represents the storage size corresponding to a peer, the vertical axis represents the video and audio transmission bit rate for a server's loading.

Take 25 peers randomly added in a VoD service in [0, 120] minutes as an example, and four different values 1, 0.2, 0.5, 0.8 are taken for fixed video and audio storing probabilities of a peer, to observe the relationship between the storage space size (in MB) corresponding to a peer and the transmission bit rate (unit is Mbps, i.e. $10^6$ bits per second) of a server's loading, and compare with the approach of simultaneously dynamic adjusting the video and audio storing probability $PW_k$ and referring the storage size of the present disclosure. FIG. 12 shows a comparison chart of experimental effects between multiple fixed video and audio storage probabilities and the dynamically adjustable the video and audio storing probability according to the exemplary embodiments, wherein the horizontal axis represents the storage size corresponding to a peer, the vertical axis represents the transmission bit rate for a server's loading; a curve 1210 represents an experimental effect of the video and audio storing probability 1, a curve 1220 represents an experimental effect of the video storing probability 0.2, a curve 1230 represents an experimental effect of the video storing probability 0.5, a curve 1240 represents an experiment effect of the video storing probability 0.8, and a curve 1250 represents an experimental effect of the present disclosure.

It may be seen from the experimental effects in FIG. 12, the larger the corresponding storage space of a peer, the smaller the transmission bit rate of the server's loading. When the peer uses a fixed video and audio storing probability, the fixed value of video storing probability has a little effect on the bit storing probability of the server's loading. Therefore, as shown in the experiment effect (curve 1250) of the present disclosure, when a storing probability of a dynamic adjustment is used to determine whether the video and audio data is stored in the storage space of the peer, for each peer with a limited storage space, it enables the stored video and audio data more easily achieving shared results, thereby reducing the server's loading. According to the exemplary embodiments of the present disclosure, this storing probability may be dynamically adjusted based on a time point that a demand peer requests sharing the video and audio data, a video and audio data bit rate, a storage space limitation of the peer, and so on.

Figure 13:
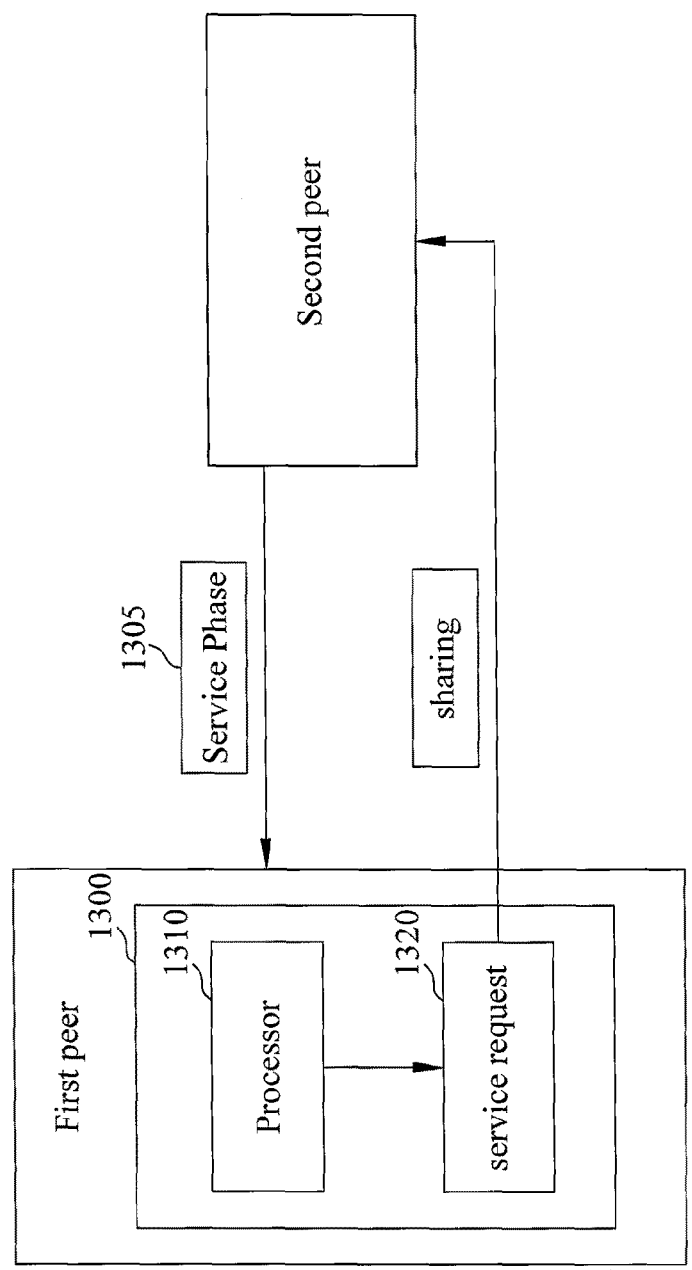
FIG. 13 shows a device operable to store video and audio data, adapted to a first peer of a video and audio data system having a plurality of peers, according to an exemplary embodiment.

FIG. 13 shows a device operable to store video and audio data, adapted to a first peer of a video and audio data system having a plurality of peers, according to an exemplary embodiment. In FIG. 13, a device 1300 operable to store video and audio data may comprise a hardware processor 1310 and a storage medium 1320. The hardware processor 1310 may perform: before the first peer has not received a service request 1305 of a second peer of the plurality of peers, determining the video and audio data received by the first peer whether been stored in the storage medium 1320 by using a dynamically adjustable first video and audio storing probability; and when the first peer receives the service request of the second peer, setting a second video and audio storing probability and extending a time interval of the first peer for storing received video and audio data, thereby the second peer obtaining at least one stored video and audio data from the first peer. In a true scope of the disclosure, this device operable to store video and audio data may be applied on various types of network environments.

Accordingly, the first video and audio storing probability and the second video and audio storing probability are two dynamically adjustable probability values, and both are less than or equal to 1 and greater than or equal to 0. Processor 1310 may refer to a service interval, a video and audio data bit rate, and a storage space limitation, to set the second video and audio storing probability. The device 1300 operable to store video and audio data may provide a P2P video and audio data sharing service for the plurality of peers in a video and audio data transmission environment. The processor 1310 and the storage medium 1320, such as, but not limited to two components of a storage module in a plurality of modules of the first peer.

In summary, a video and audio data storage technology is provided according to the exemplary embodiments of the present disclosure. This technology uses the storing probability to decide whether the video and audio data is stored in a storage space of a device. When a peer has not yet received the service request from other peer(s), the peer dynamically adjusts a first storing probability; and when the peer receives a service request from a demand peer, it sets a second storing probability according to a time point of the demand peer requesting, a video and audio data bit rate and a storage space limitation, and extends a time interval for storing the video and audio data. Accordingly, for a peer device with a limited storage space, it may randomly discard some video and audio data that have been viewed based on the value of the storing probability, to increase the P2P sharing rate of stored video and audio data, thereby reducing the server's loading of the video and audio sources. In a true scope of the disclosure, this video and audio data storage technology may be applied on various types of network environments, but not limited to P2P network environment(s).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method operable to store video and audio data at a first peer of a video and audio data system having a plurality of peers, wherein each peer has a processor and a storage medium corresponding to a storage space, the method, performed by the processor, comprising:
   before the first peer has received a service request of a second peer of the plurality of peers, determining whether at least one video and audio data received by the first peer is stored in the storage medium, by using a first video and audio storing probability that is dynamically adjustable, and extending a time interval of the first peer for storing at least one received video and audio data; and
   when the first peer receives the service request of the second peer, setting a second video and audio storing probability, thereby the second peer obtaining at least one stored video and audio data from the first peer;
   wherein the second video and audio storing probability is set based on a service interval, a video and audio data bit rate, and a storage space limitation; and
   wherein the service interval represents a time length between two time points, wherein one of the two time points is a playing time point of latest data in a storage space corresponding to the first peer, and the other time point is a playing time point of the first peer storing the video and audio data in a specific cycle requested by the second peer.

2. The method as claimed in claim 1, wherein when the first peer has not received the service request from the second peer, the first peer receives the at least one video and audio data from a server or at least one other peer of the plurality of peers.

3. The method as claimed in claim 1, wherein when the first peer does not receive the service request from the second peer, the first peer adjusts the first video and audio storing probability in a waiting cycle of a waiting phase, and continues to wait for a next waiting cycle to check whether the service request of other peer of the plurality of peers is received.

4. The method as claimed in claim 1, wherein when the first peer receives the service request from the second peer, it sets the second video storing probability in a service cycle of a service phase.

5. The method as claimed in claim 1, wherein the first peer is a device with a limited storage space.

6. The method as claimed in claim 3, wherein the waiting phase includes at least one waiting cycle, and in each of the at least one waiting cycle, the first peer uses a parameter α, $0 \leq \alpha \leq 1$, to adjust the first video and audio storing probability.

7. The method as claimed in claim 1, wherein the first video storing probability and the second video storing probability are two dynamically adjustable probabilities for storing the at least one video and audio data, and the two probabilities are less than or equal to 1 and greater than or equal to 0.

8. The method as claimed in claim 1, wherein said method is executed by a processor of the first peer, and the storage space corresponding to the first peer is a storage medium of the first peer.

9. A device operable to store video and audio data at a first peer of a video and audio data system having a plurality of peers, and the device comprising:
   a processor; and
   a storage medium,
   wherein the processor performs: before the first peer has received a service request of a second peer of the plurality of peers,
   determining whether at least one video and audio data received by the first peer is stored in the storage medium, by using a first video and audio storing probability that is dynamically adjustable, and extending a time interval of the first peer for storing at least one received video and audio data; and when the first peer receives the service request of the second peer, setting a second video and audio storing probability;
   thereby the second peer obtaining at least one stored video and audio data from the first peer;
   wherein the second video and audio storing probability is set based on a service interval, a video and audio data bit rate, and a storage space limitation; and
   wherein the service interval represents a time length between two time points, wherein one of the two time points is a playing time point of latest data in a storage space corresponding to the first peer, and the other time point is a playing time point of the first peer storing the video and audio data in a specific cycle requested by the second peer.

10. The device as claimed in claim 9, wherein the processor and the storage medium are two components of a storage module of a plurality of modules of the first peer.

11. The device as claimed in claim 9, wherein the first peer is a device with a limited storage space.

12. The device as claimed in claim 9, wherein in the plurality of peers of the video and audio data system, the device provides a P2P sharing service of the at least one video and audio data.

13. The device as claimed in claim 9, wherein the first video storing probability and the second video storing probability are two dynamically adjustable probabilities for storing the at least one video and audio data, and the two probabilities are less than or equal to 1 and greater than or equal to 0.

* * * * *